United States Patent [19]
Cholin et al.

[11] Patent Number: 4,855,718
[45] Date of Patent: Aug. 8, 1989

[54] FIRE DETECTION SYSTEM EMPLOYING AT LEAST ONE OPTICAL WAVEGUIDE

[75] Inventors: John M. Cholin, Oakland, N.J.; Jeffrey G. Cholin, Pound Ridge, N.Y.

[73] Assignee: Firetek Corporation, Hawthorne, N.J.

[21] Appl. No.: 78,552

[22] Filed: Jul. 28, 1987

[51] Int. Cl.$^4$ ............................................. G08B 17/12
[52] U.S. Cl. ................................. 340/578; 250/554; 431/13; 431/79
[58] Field of Search ............... 340/578, 600; 250/227, 250/573, 216, 554; 431/13, 79; 333/239

[56] References Cited

U.S. PATENT DOCUMENTS

| | | | |
|---|---|---|---|
| 3,824,391 | 7/1974 | Noltingk et al. | 340/578 |
| 4,432,286 | 2/1984 | Witte | 431/13 |
| 4,701,624 | 10/1987 | Kern et al. | 340/578 |
| 4,709,155 | 11/1987 | Yamaguchi et al. | 431/79 |

*Primary Examiner*—Glen R. Swann, III
*Attorney, Agent, or Firm*—W. Patrick Quast

[57] ABSTRACT

A fire detection system has a detector for sensing optical radiation from a spark or flame or hot spot and an optical waveguide comprising an elongate hollow tube, having an inlet end portion for placement in a hostile, hazardous environment, and having an outlet end portion for emitting light rays to the detector and for placement in a benign, non-hazardous environment, and having a reflective inner surface forming a passage for transmitting the optical radiation from the tube inlet end portion to the tube outlet end portion by successive internal reflections.

The elongate hollow waveguide tube is sealed at the inlet end portion by a lens which admits the optical radiation to the tube; and at the outlet end typically by the detector. The sealed tube is filled with an inert gas, such as nitrogen, which helps to maintain the reflective interior surface of the tube.

6 Claims, 1 Drawing Sheet

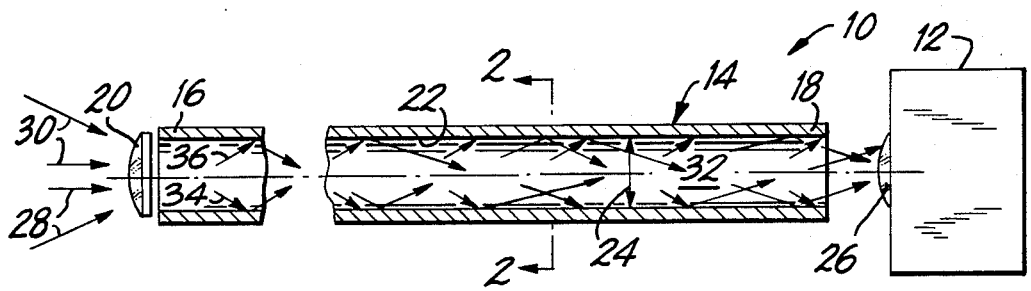
FIG. 1
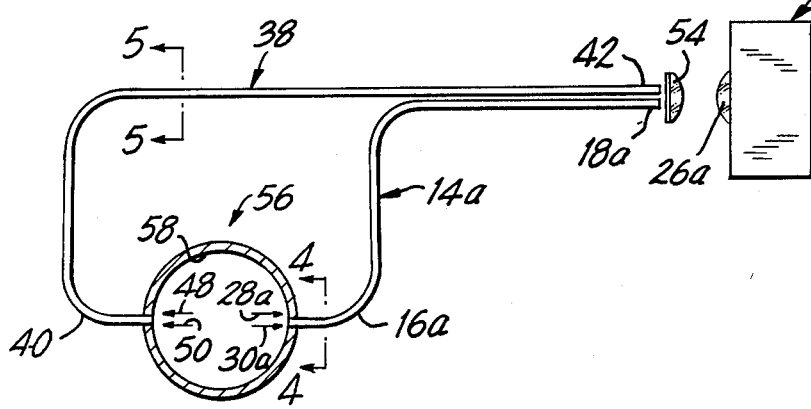
FIG. 3
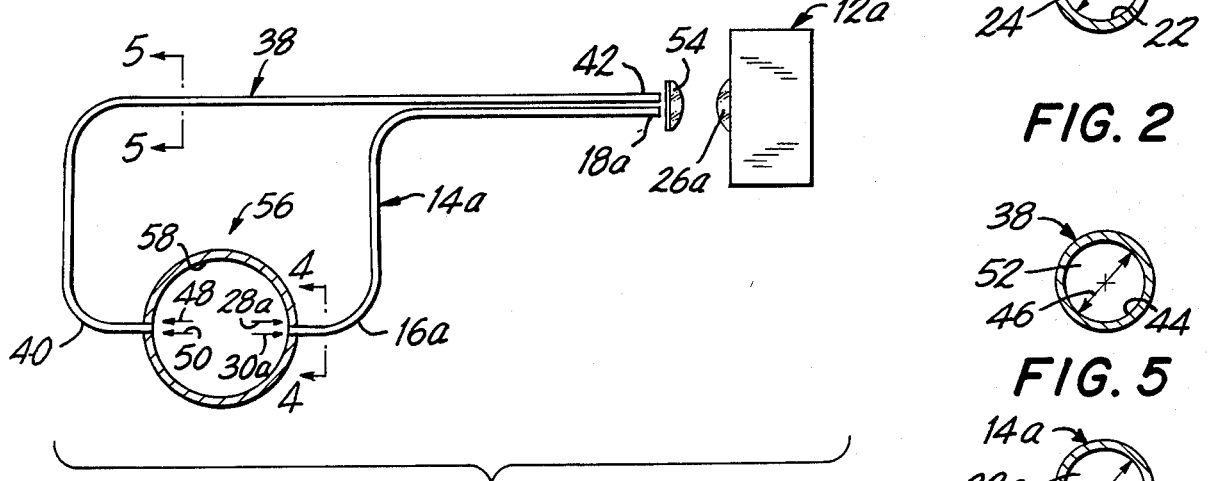
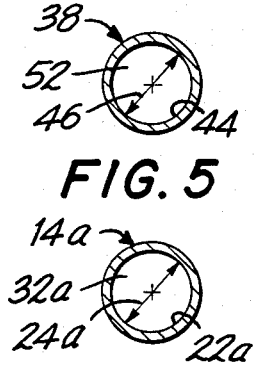
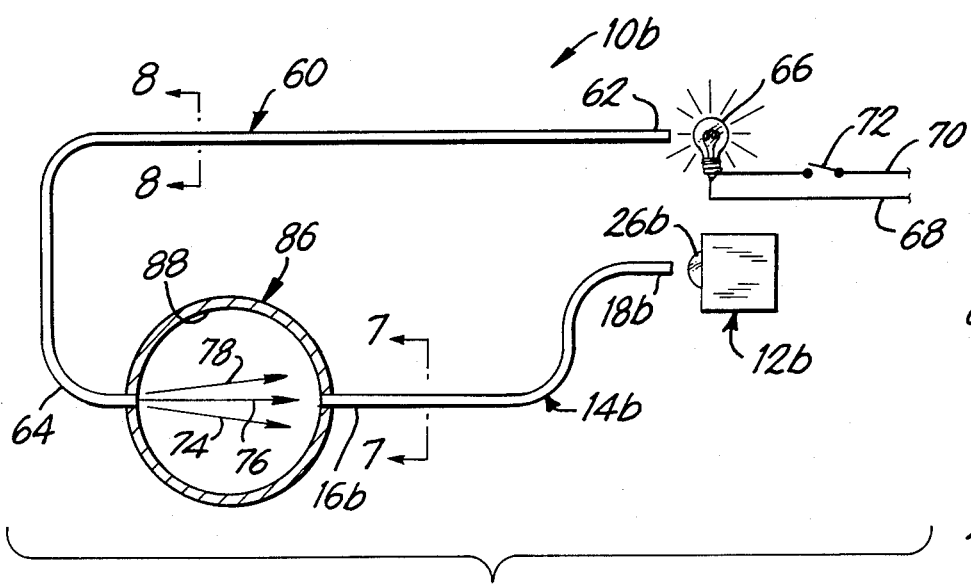
FIG. 6
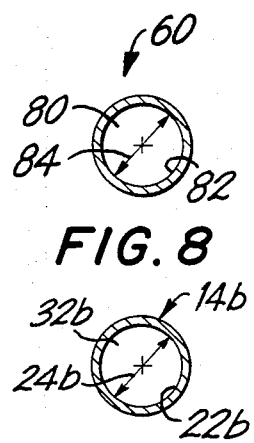

4,855,718

FIRE DETECTION SYSTEM EMPLOYING AT LEAST ONE OPTICAL WAVEGUIDE

BACKGROUND OF THE INVENTION

The invention relates to a fire detection system, and in particular, relates to a fire detection system having an optical waveguide.

The prior art fire detection system includes a spark detector and an elongate glass optical fiber member, which has an outlet end portion that faces the spark detector and which has an inlet end portion to be disposed in a hazardous environment.

One problem with the prior are fire detection is that the optical fiber member is subject to failure when installed in a hazardous environment, such as where it is exposed to a temperature above 500 degrees Farenheit. The optical fiber member begins to decrepitate at a temperature between about 400 to 500 degrees Farenheit. In addition the very small diameter of the optical fibers limit the quantity of radiation which can be conveyed to the detector. This limits the sensitivity of the detection system.

SUMMARY OF THE INVENTION

According to the present invention, a fire detection system is provided. The system includes a spark or flame detector and an optical wave guide. The waveguide consists of an elongate hollow tube, which has an outlet end portion that faces the spark or flame detector and which has an inlet end portion to be disposed in the hazardous environment. The hollow tube has an inner surface which is a light reflective surface thus providing the conveyance of optical radiation over long distances, and around curves.

By using a hollow tube having a light reflective inner surface, the tube being made of a material such as aluminum or stainless steel, the optical waveguide overcomes the problem of the failure of the prior art system in a hazardous environment which is exposed to a temperature about about 500 degrees Farenheit. In addition the inside diameter can be made very much larger than the largest optical fibers thereby increasing the sensitivity of the detection system.

BRIEF DESCRIPTION OF THE DRAWINGS

FIG. 1 is a schematic elevation view of a first embodiment of the invention;

FIG. 2 is a sectional view as taken along the line 2—2 of FIG. 1;

FIG. 3 is a schematic elevation view of a second embodiment of the invention;

FIG. 4 is a sectional view as taken along the line 4—4 of FIG. 3;

FIG. 5 is a sectional view as taken along the line 5—5 of FIG. 3;

FIG. 6 is a schematic elevation view of a third embodiment of the invention;

FIG. 7 is a sectional view as taken along the line 7—7 of FIG. 6; and

FIG. 8 is a sectional view as taken along the line 8—8 of FIG. 6.

DESCRIPTION OF THE PREFERRED EMBODIMENTS

In FIG. 1, a fire detection system 10 is shown. System 10 includes a spark or flame detector 12 and an elongate hollow metal tube 14.

Tube 14 has an inlet end portion 16 and has an outlet end portion 18. Inlet end 16 has a light admitting lens 20. Tube 14, which is a metal tube, has an inner surface 22, which is highly polished. Tube 14 has an inner diameter 24 of about 0.4 inch, which is many times larger than the equivalent diameter of the prior art fiber optic strand.

Detector 12 is a conventional spark detector or flame detector that has an optically active photocell. Detector 12 has a window 26.

End portion 16 is disposed in the hot, hazardous environment. Lens 20 faces the spark or flame which is to be detected. End portion 18 and detector 12 are disposed in the cool, non-hazardous environment. Lens 20 admits optical radiation rays 28, 30, which are emitted by a spark, a flame, or a surface hot spot, in the hazardous environment, not necessarily directly in front of the lens, 20.

Tube 14 has an elongate passage 32, which contains an inert gas, such as nitrogen to maintain the reflective interior surface. Lens 20 is in sealing engagement with end portion 16 for containing the gas. End portion 18 is also in sealing engagement with detector 12.

Rays 28, 30 have respective paths through passage 32, and are reflected by inner surface 22, The respective paths of rays 28, 30 are indicated by arrows 34, 36.

In FIG. 3, parts which are like parts of FIG. 1 have like numerals, but with a subscript "a" added thereto.

In FIG. 3, fire detection system 10a includes flame or spark detector 12a and an elongate hollow metal tube 14a.

Tube 14a has an inlet end portion 16a and has an outlet end portion 18a. In FIG. 4, tube 14a, which is a metal tube, has an inner surface 22a and an inner diameter 24a. Detector 12a has a window 26a.

Inlet end portion 16a admits rays 28a, 30a through a lens (not shown). In FIG. 4, tube 14a has an elongate passage 32a.

System 10a includes a second hollow metal tube 38, which has an inlet end portion 40 and an outlet end portion 42. Tube 38 has an inner surface 44 and an inner diameter 46.

Inlet end portion 40 admits rays 48, 50 through a lens (not shown) to a passage 52 in tube 38.

Outlet end portion 18a and outlet end portion 42 emit their respective rays 28a, 30a and 48, 50 through a common lens 54 to the window 26a of detector 12a. More than two waveguide tubes such as 38 and 14a can be employed to increase the amount of radiation conveyed to the spark or flame detector, or may be employed to increase the area of coverage of a single spark or flame detector.

Inlet end portion 16a and inlet end portion 40, are fixedly connected and sealed to a duct 56, or area to be detected, which has an inner surface 58.

Each tube 14a, 38 has an inert gas therein, and is sealed at each end. Lens 54 is in sealing engagement to outlet end portions 18a, 42.

With this construction, a plurality of tubes 14a, 38 provide a single signal to detector 12a.

The internal reflectance of the optical waveguide allows for the propagation of light for long distances and around curves not attainable with other optical systems.

Duct 56 is a utility plant, coal furnace, preheater inlet duct, which has a plurality of fire detection tubes 14a, 38, in order to monitor hot spots along the tube.

In FIG. 6, parts which are like parts of FIG. 1 have like numerals, but with a subscript "b" added thereto.

In FIG. 6, fire detection system 10b includes spark detector 12b and an optical waveguide as described above.

Tube 14b has an inlet end portion 16b and has an outlet end portion 18b. In FIG. 7, tube 14b, which is a metal tube, has an inner surface 22b and an inner diameter 24b. Detector 12b has a window 26b.

Inlet end portion 16b similarly admits rays (not shown) through a lens (not shown). Tube 14b has a passage 32b.

System 10b has another tube 60, which has an inlet end portion 62. Tube 60 has an outlet end portion 64.

A test light 66 is disposed facing the inlet end portion 62. Light 66 has a pair of electrical conductors 68, 70 and a switch 72.

Light rays 74, 76, 78, which are emitted from outlet end portion 64, pass through passage 80 (FIG. 8) of tube 60 by means of successive internal reflections as described above. Tube 60 has an inner surface 82, which is light reflective and has an inner diameter 84 of about the same size as inner diameter 24b.

Light rays 74, 76, 78 from test light 66 are conveyed across duct 86, so that the operability of detector 12b can be tested during the high temperature condition inside duct 86. Duct 86 has an inner surface 88, which is subject to the high temperature of the fluid passing through duct 86.

Some aluminum tubes and stainless steel tubes, like tube 14, have a deflectance factor of at least ninety percent. This factor varies with the condition of the tube inner surface 22 and the size of the tube inner diameter 24. Nevertheless, this allows radiation to travel long distances and around curves without significant attenuation of the signal.

System 10, 10a, 10b have advantages as indicated hereafter.

1. The sensitivity of an optical detector is approximately proportional to the cross-sectional area of the aperture of the optical detector. Since the aperture is defined as either the cross-sectional area of the optical fiber or the cross-sectional area of the waveguide, since the aperture area of tube 14 is much greater than the aperture area of the prior art fiber optic strand, the sensitivity of detector 12 and system 10 is much greater than the prior art system.

2. Tube 14, which is filled with an inert gas, is more rugged in construction than the prior art fiber optic strand. Tube 14, which is a metal tube, can withstand a temperature of over 2000 degrees Farenheit, while the prior art fiber optic strand is limited to under 500 degrees Farenheit, to avoid a failure. Due to its simplicity the cost of construction of system 10 is substantially less than the cost of construction of the prior art system.

3. System 10 can transmit radiation in portions of the spectrum, such as in the 3 to 5 micron range of the infra-red spectrum; but the prior art system cannot transmit radiation in such portions of the spectrum. System 10 can also be employed in a greater range of wavelengths throughout the optical radiation range, than the prior art system.

Tubes 14, 14a, 14b, 38, 60, which are metal tubes, can be made of stainless steel, or aluminum, or known metal alloys.

The lens member, e.g. 20, in the different figures is shown schematically. The lens equation determining the specific nature of the lens, e.g. plano-convex, plano-concave, etc. as will be obvious to those skilled in the art, will be a function of the particular application.

Systems 10, 10a, 10b can also be used in a portion of a jet engine, roasting ovens, heat exchangers, exhaust ducts in order to monitor sparks, flames or hot spots therein. Other possible hazardous environments for which the detection system of the present invention would be suitable include: conveyor belts or storage vessels for hot or radioactive materials.

The embodiments of an invention in which an exclusive property or right is claimed are defined as follows:

1. A fire detection system comprising:
   a detector for sensing optical radiation from a spark or flame; and
   an elongate hollow waveguide tube having an inlet end portion for placement in a hostile, hazardous environment and having an outlet end portion for emitting the optical radiation to the detector and for placement in a benign, non-hazardous environment, said tube having a reflective inner surface forming a passage for transmitting the optical radiation from the tube inlet end portion to the tube outlet end portion by successive internal reflections.

2. The system of claim 1, including:
   a lens fixedly connected and sealed to said tube inlet end portion for transmittal of the optical radiation therethrough and into the passage; means for sealing said outlet end portion; and
   an inert gas disposed in said passage for maintaining the reflectance of the interior surface of the waveguide tube.

3. The system of claim 2, wherein said detector has a window for receiving the optical radiation from the passage at the tube outlet end portion, said means for sealing said outlet end portion comprising said detector, said detector being fixedly connected and sealed to said tube outlet end portion.

4. The system of claim 1, including:
   at least one additional elongate hollow waveguide tube, each having an inlet end portion for placement in the hostile, hazardous environment and having an outlet end portion for emitting optical radiation and for placement in the benign, non-hazardous enviroment, each said additional tube having a reflective inner surface forming a passage for transmitting the optical radiation from the tube inlet end portion to the tube outlet end portion by successive internal reflections; and
   a common lens disposed between said detector and said outlet portions of said first tube and each said additional tube,
   said outlet end portions of said first tube and each said additional tube being disposed adjacent to each other for facing said common lens,
   whereby a single signal is sent from all said tubes to the detector.

5. The system of claim 1, including
   an elongate test hollow waveguide tube having an inlet end portion disposed in the benign, non-hazardous environment and having an outlet end portion disposed in the hostile, hazardous environment to be monitored, said outlet end portion of the test tube being disposed opposite to said inlet end portion of the elongate hollow waveguide tube, said test tube having a reflective inner surface for the transmission of light rays by successive internal reflections;

a test lamp disposed adjacent to said test tube inlet end portion for transmitting light rays through the monitored, hostile environment and through the elongate hollow waveguide tube, to the detector, whereby the operability of the system is tested during the hostile condition to be monitored.

6. The system of claim 5, wherein said test lamp has a pair of conductors and a switch.

* * * * *